(12) United States Patent
Sheng et al.

(10) Patent No.: US 7,236,274 B2
(45) Date of Patent: Jun. 26, 2007

(54) CALIBRATION MECHANISM FOR AN OPTICAL MODULE OF A SHEET-FED SCANNER

(75) Inventors: Thomas Sheng, Hsin Chu (TW); Chi-Yao Chen, Hsin Chu (TW)

(73) Assignee: Avision Inc., Hsinchu (TW)

( * ) Notice: Subject to any disclaimer, the term of this patent is extended or adjusted under 35 U.S.C. 154(b) by 977 days.

(21) Appl. No.: 10/299,259

(22) Filed: Nov. 18, 2002

(65) Prior Publication Data
US 2004/0021916 A1    Feb. 5, 2004

(30) Foreign Application Priority Data
Jul. 31, 2002   (TW) .............................. 91211712 U

(51) Int. Cl.
*H04N 1/46*   (2006.01)
(52) U.S. Cl. ...................... 358/504; 358/406; 358/496; 358/505; 382/274; 399/207
(58) Field of Classification Search ................ 358/449, 358/109, 504, 406, 496, 505; 382/274; 399/207
See application file for complete search history.

(56) References Cited

U.S. PATENT DOCUMENTS

| | | | | |
|---|---|---|---|---|
| 6,166,394 A | * | 12/2000 | Rubscha | ................. 250/559.42 |
| 6,839,155 B2 | * | 1/2005 | Spencer | ...................... 358/488 |
| 6,947,187 B2 | * | 9/2005 | Mui et al. | .................... 358/496 |
| 2002/0176122 A1 | * | 11/2002 | Mui et al. | .................... 358/504 |

* cited by examiner

*Primary Examiner*—Aung S. Moe
*Assistant Examiner*—Andrew Lam

(57) ABSTRACT

A calibration mechanism for an optical module of a sheet-fed scanner is disclosed. The calibration mechanism includes a calibration strip and a driving unit. The calibration strip is moved by the driving unit, and the calibration strip may be moved relative to the optical module for calibrating color depth. The driving unit includes a roller and a flexible strip. One end of the flexible strip is mounted to the roller, and the calibration strip is mounted or formed on the flexible strip. The flexible strip is moved by the roller action so that the calibration strip is moved relative to the optical module, and the optical module may accordingly calibrate the color depth.

6 Claims, 7 Drawing Sheets

CALIBRATION MECHANISM FOR AN OPTICAL MODULE OF A SHEET-FED SCANNER

FIELD OF THE INVENTION

The present invention relates to a calibration mechanism, and in particular to the calibration mechanism for an optical module of a sheet-fed scanner.

BACKGROUND OF THE INVENTION

A conventional flat-bed scanner has a movable optical module therein which scans a calibration strip at a fixed position before proceeding scanning so as to obtain multiple scanning lines and according to the scanning lines to calibrate the optical module.

A sheet-fed scanner has a feature of automatically feeding the sheets which are scanned by the optical module in the scanner. Due to the movement of the sheet, the fixed optical module cannot calibrate the color depth for multiple lines before the image scanning. The optical module can only scan single one line to calibrate the color depth. If there is dust or defect at the position of the line to be scanned, the result is incorrect such that the calibration of color for single line scanning has low reliability.

A combination of a flat-bed scanner and sheet-fed scanner may proceed double-side scanning. If the flat-bed scanner has a calibration strip on the optical module thereof, the calibration strip on the optical module of the flat-bed scanner and the optical module of the sheet-fed scanner have relative movement when the optical module of the flat-bed scanner moves to proceed calibration of color. By this way, the optical module of the sheet-fed scanner may have multiple scanning lines on the calibration strip so as to proceed the calibration of color for the multiple scanning lines.

Nevertheless, once the flat-bed scanner and the sheet-fed scanner are separated, and the sheet-fed scanner is used individually, the calibration of color cannot be proceeded. Even they are used in combination, the gap between the two respective optical modules of the sheet-fed scanner and the flat-bed scanner is large, so that the quality of the scanning lines obtained by the optical module on the sheet-fed scanner is not satisfied, and the reliability of the calibration of color is affected.

It is to be noted that the sheet-fed scanner includes a single scanning unit which can be operated independently, and a sheet-fed scanning unit which can be combined with the flat-bed scanner to proceed double-side scanning.

SUMMARY OF THE INVENTION

The primary object of the present invention is to provide a color calibration mechanism for an optical module of a sheet-fed scanner.

Another object of the present invention is to provide a calibration mechanism of an optical module that has simple structure.

Yet another object of the present invention is to provide a calibration mechanism that has a better result.

In order to achieve the purposes mentioned above, a calibration strip is installed in the sheet-fed scanner and can be moved relatively to the optical module.

The present invention will become more obvious from the following description when taken in connection with the accompanying drawings which show, for purposes of illustration only, preferred embodiments in accordance with the present invention.

DETAILED DESCRIPTION OF THE PREFERRED EMBODIMENTS

Figure 1:
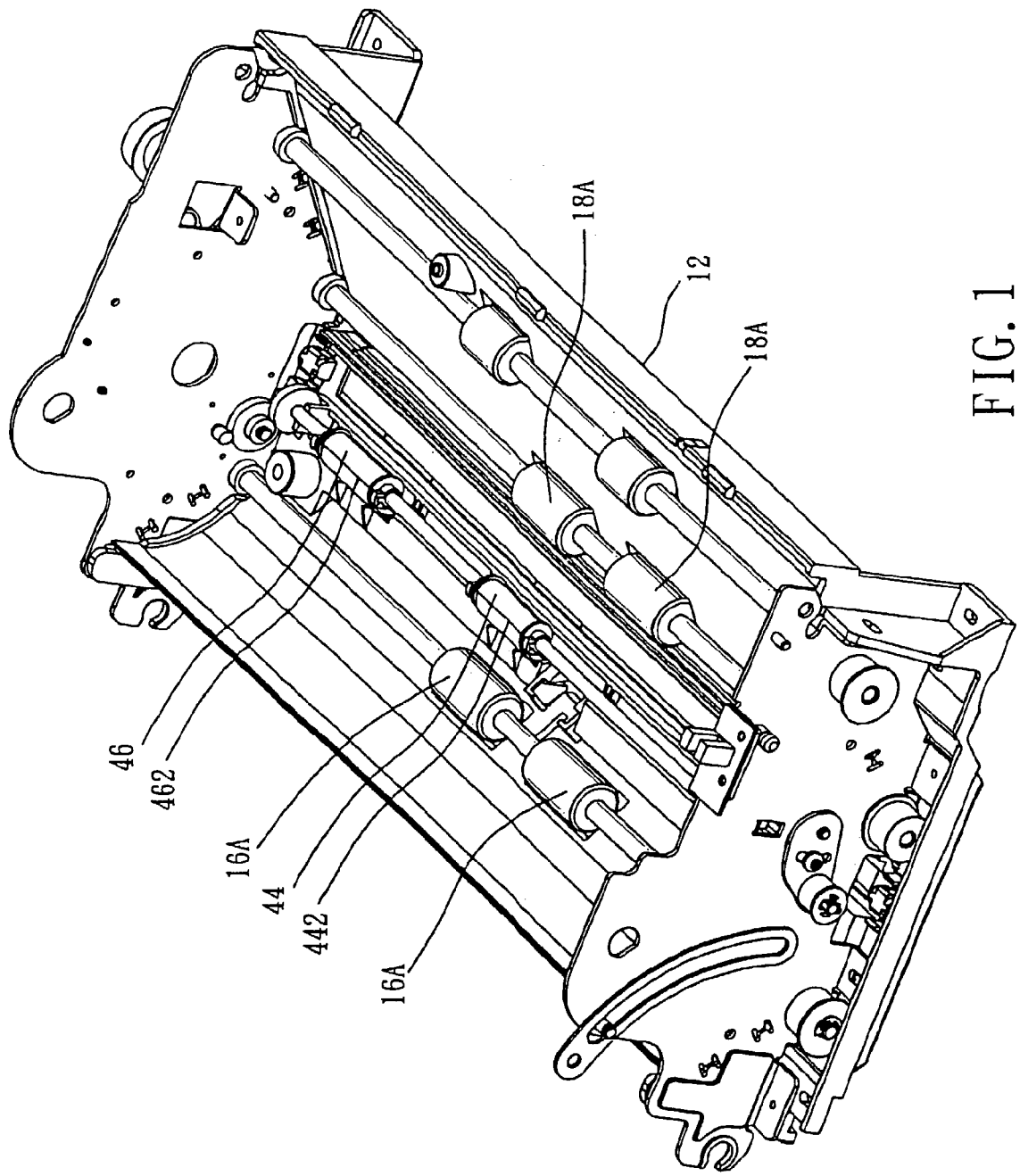
FIG. 1 is a perspective view to show a part of the mechanism.
Figure 2:
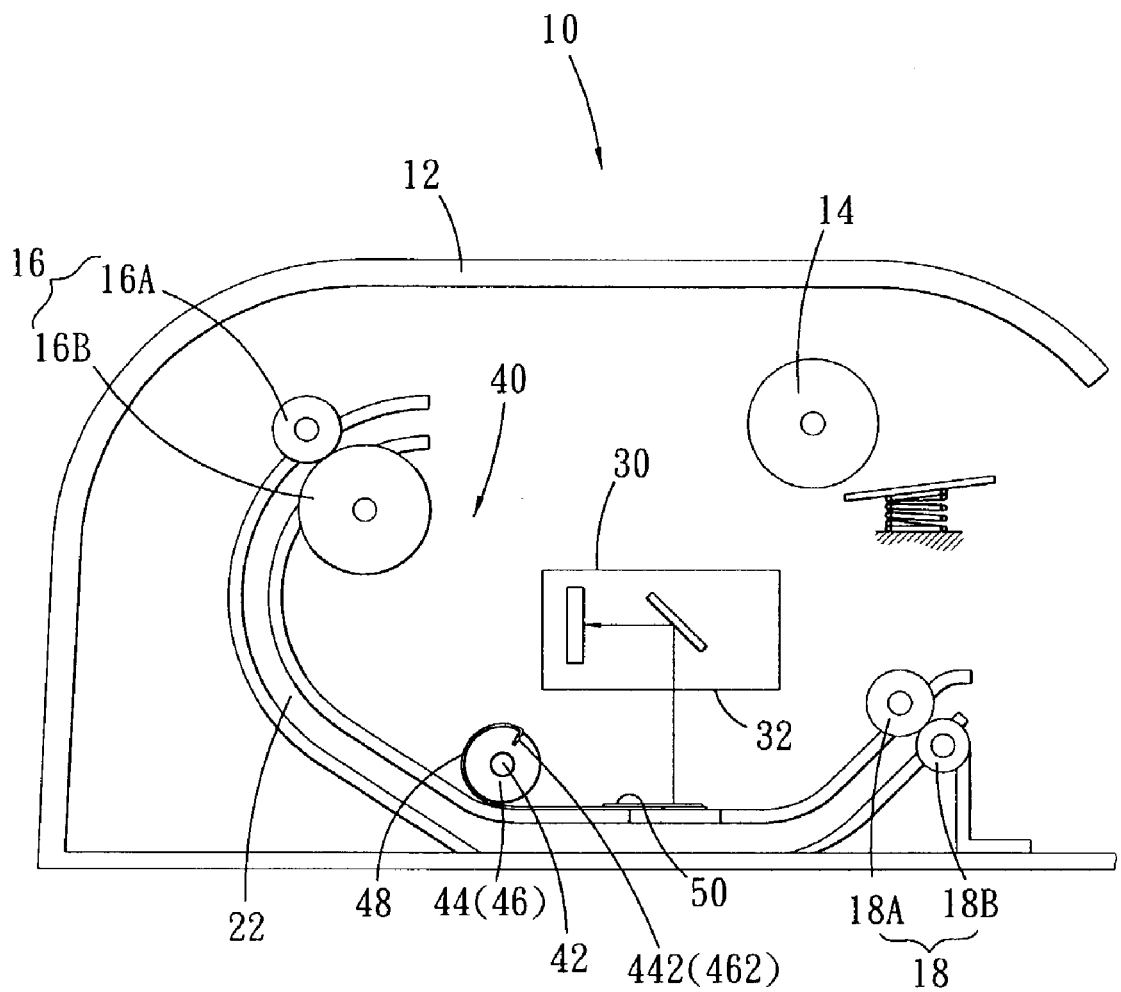
FIG. 2 shows the mechanism of the present invention.

Referring to FIGS. 1 and 2, the sheet-fed scanner 10 includes a casing 12 which has a feed roller 14 and a first feed roller unit 16 and a second feed roller unit 18. The first feed roller unit 16 is composed of a pair of rollers 16A, 16B and the second feed roller unit 18 is composed of a pair of rollers 18A, 18B. A passage 22 is defined between the first feed roller unit 16 and the second feed roller unit 18.

An optical module 30 is fixed in the casing 12 and has a scanning surface 32 for scanning images on a side of the module 30. The scanning surface 32 is located in correspondence with a window 24 which is located above the passage 22 and may also be a part of the passage 22.

Figure 3:
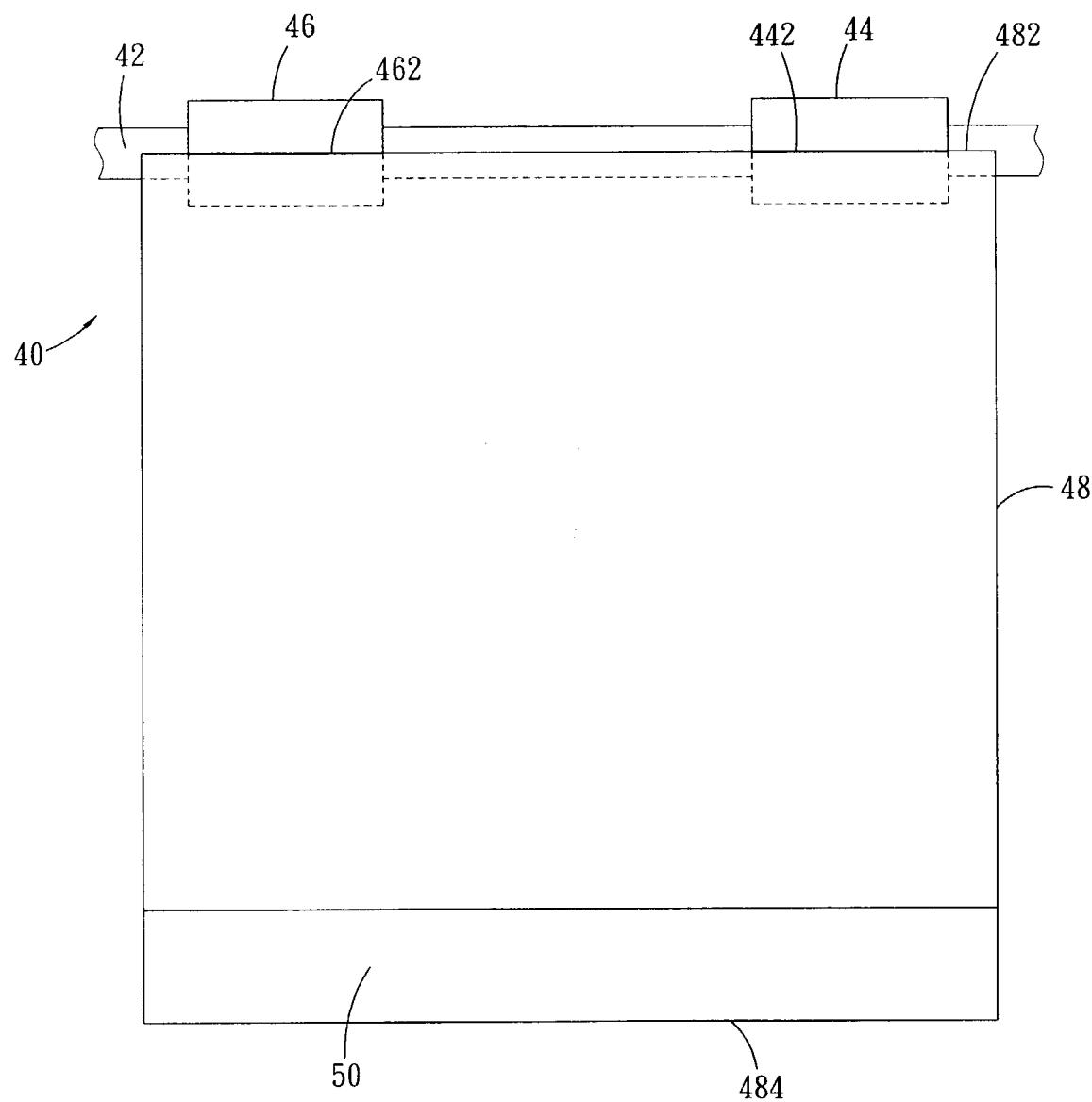
FIG. 3 shows the rollers and the flexible strip of the present invention.
Figure 4:
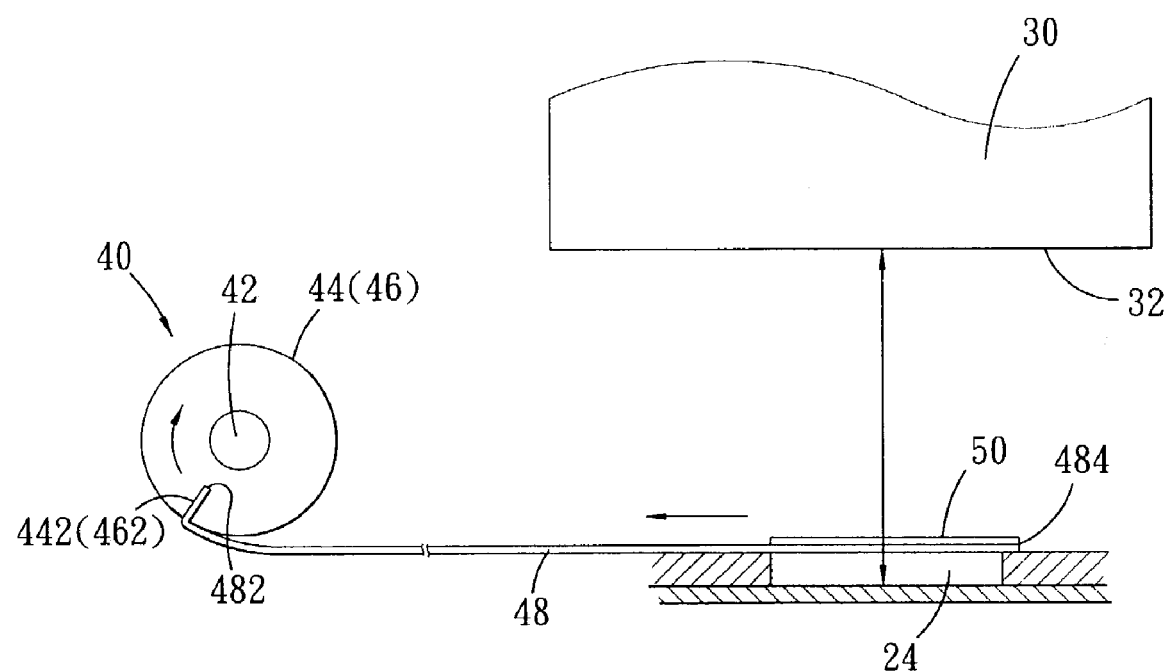
FIG. 4 shows a first status of the mechanism of the present invention.

Referring to FIGS. 2 to 4, a calibration mechanism 40 includes a shaft 42, at least one roller 44, 46 (two rollers as an example in this embodiment), a flexible strip 48 and a calibration strip 50. The shaft 42 is mounted in the casing 12 and is rotatable.

The two rollers 44, 46 are mounted on the shaft 42 and each have a slit 442, 462.

The flexible strip 48 has an end 482 inserted in the slits 442, 462 of the rollers 44, 46, and the other end 484 of the flexible strip 48 is a free end.

The calibration strip 50 is attached to the surface of the flexible strip 48 and located close to the free end of the flexible strip 48. The calibration strip 50 may also be a one-piece member with the flexible strip 48, such as having colors on the flexible strip 48 or using larger calibration strip so that it has a feature of calibration strip and a feature of the flexible strip.

It is noticed that the flexible strip 48 covers onto the window 24 and calibration strip 50 is movable to a position facing the scanning surface 32 of the optical module 30 such that the optical module 30 may scan multiple scanning lines. The parts 42, 44, 46 and 48 can be called as a driving unit for driving the calibration strip 50 to move over the optical module 30. Actually, any driving unit that drives the calibration strip 50 to move over the optical module 30, such as linear motor or lead screw, can achieve the purpose of the present application.

Referring to FIG. 4, before proceeding scanning, the rollers 44, 46 rotate to wrap the flexible strip 48 onto the outside of the rollers 44, 46. The calibration strip 50 is moved with the rotation of the flexible strip 48, so that the calibration strip 50 has a relative movement to the optical module 30.

By the relative movement of the calibration strip 50 and the optical module 30, the optical module 30 may have multiple scanning lines from the calibration strip 50 and used as a foundation for calibrating colors of the optical module 30.

Figure 5:
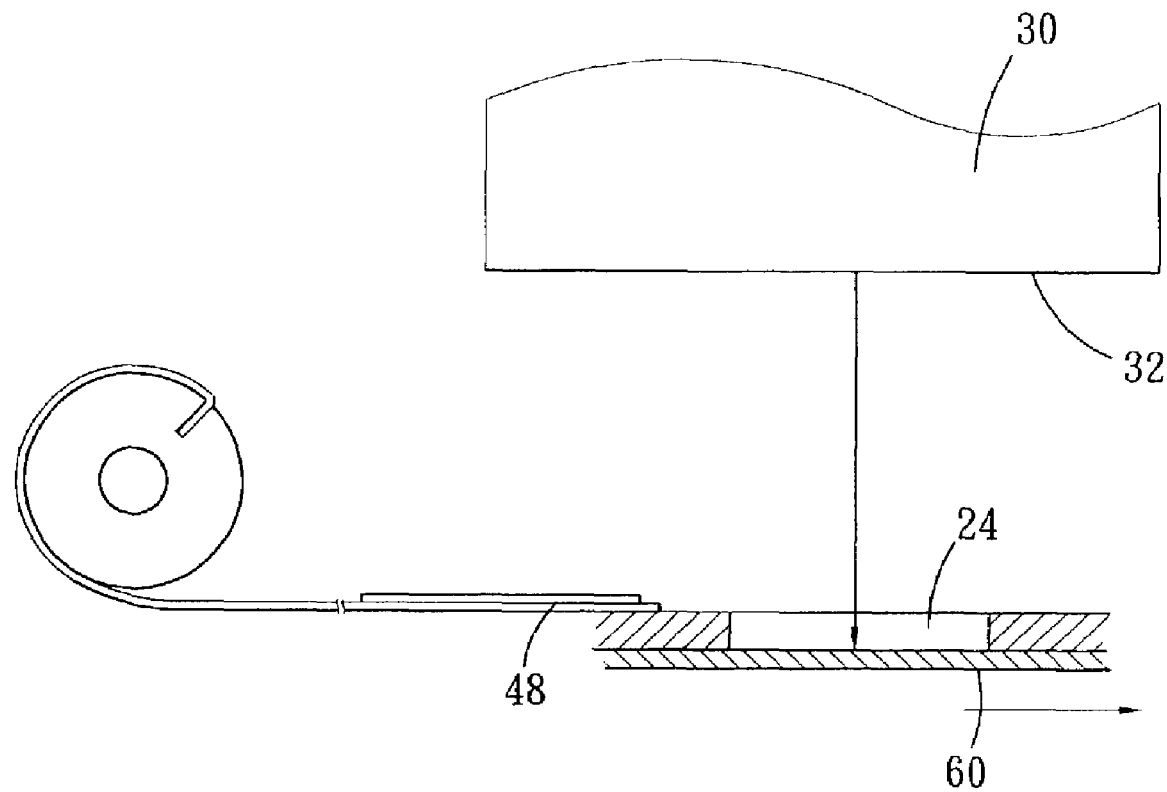
FIG. 5 shows a second status of the mechanism of the present invention.

Referring to FIG. 5, in order to proceed scanning, after the flexible strip 48 is wrapped, the flexible strip 48 is not covered onto the window 24. By this way, the scanning surface 32 of the optical module 30 may face the window 24, when the document 60 is moved below the window 24, the optical module 30 may receive the images.

Figure 6:
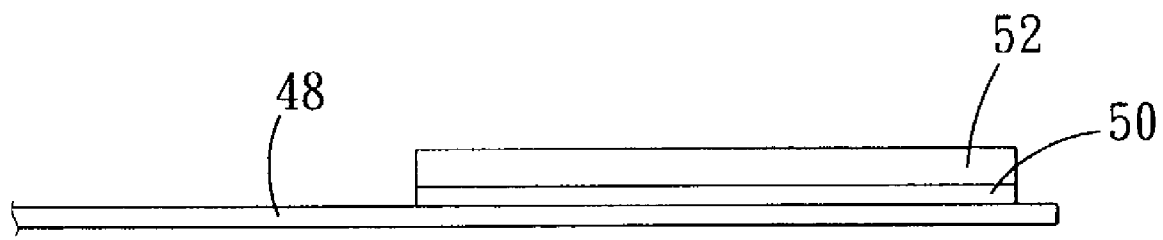
FIG. 6 shows another embodiment of the present invention.

Referring to FIG. 6, a calibration strip 50 is attached on the flexible strip 48 and a transparent cap 52 is located above the calibration strip 50. The transparent cap 52 can be made of glass which does not affect the calibration and may prevent the calibration strip 50 from being contaminated.

Figure 7:
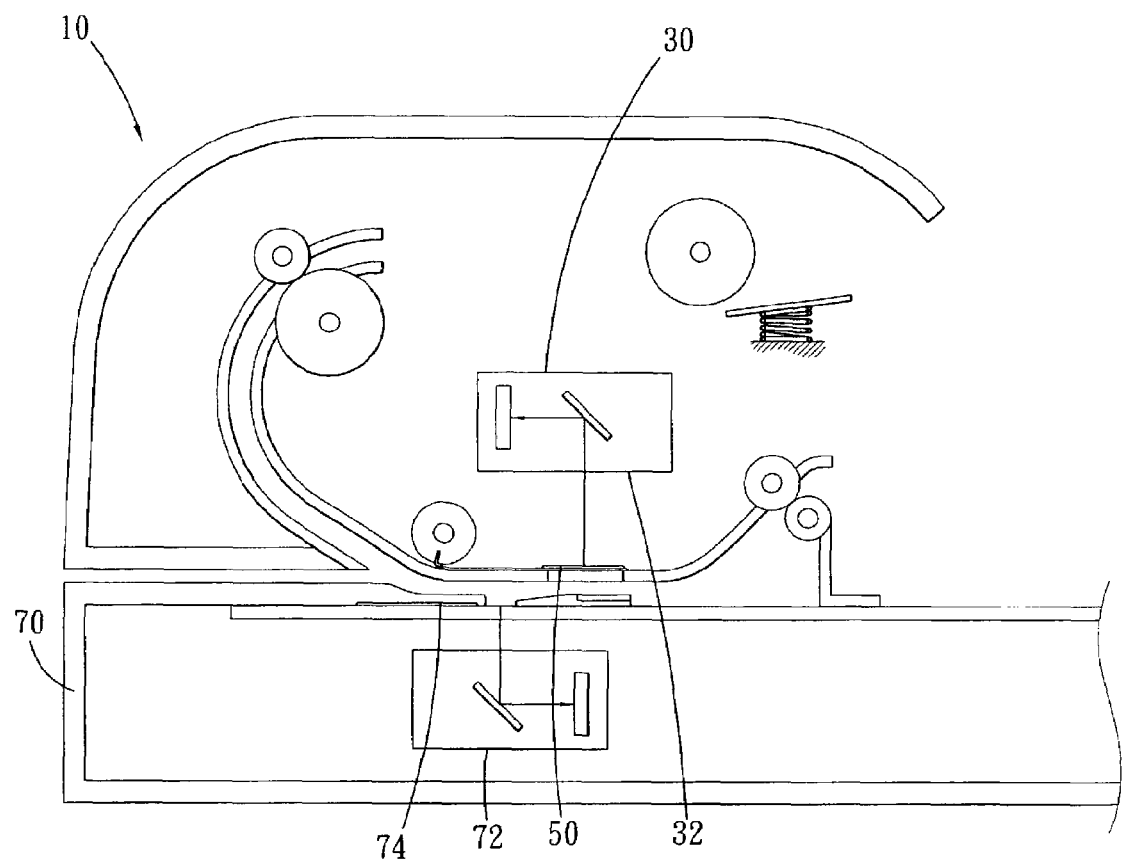
FIG. 7 shows a combination of the sheet-fed scanner and the flat-bed scanner.

Referring to FIG. 7, double-side scanning can be made when the sheet-fed scanner 10 is combined with the flat-bed scanner 70. The optical module 30 in the sheet-fed scanner 10 and the optical module 72 in the flat-bed scanner may proceed calibration of color of the calibration strips 50, 74 in the scanners 10, 70. The results of the images of scanning are satisfied by either the sheet-fed scanner 10 or the flat-bed scanner 70.

By the embodiment of the present invention, the sheet-fed scanner 10 has a function of calibration of colors. The present invention employs the rollers 44, 46 to drive the flexible strip 48 so as to make a relative movement between the optical module 30 and the calibration strip 50 and to have the information about the multiple scanning lines. The structure is compact and simple. The calibration strip 50 is installed in the sheet-fed scanner 10, so the gap between the optical module 30 and the calibration strip 50 is small. The result of scanning can obtain the better scanning lines and the quality of the calibration of color of the optical module 30 can be increased.

Before proceeding another calibration, the rollers 44, 46 push the flexible strip 48 out to let the calibration strip 50 face the scanning surface 32 of the optical module 30, and the steps are proceeded as described before.

The embodiment above discloses that the calibration strip 50 moves to allow the optical module 30 to obtain the scanning lines, a predictable embodiment is that the calibration strip 50 is fixed at a position not affecting the scanning and the optical module 30 is movable to obtain the scanning lines on the calibration strip 50 so as to be the foundation information of calibration of color.

It is to be noticed that the rollers 44, 46 and the shaft 42 may be a one-piece member. In detail, a cylindrical roller (slits are defined in the roller) may be used to replace the shaft 42 and the rollers 44, 46 so as to achieve the feature of moving the calibration strip.

While we have shown and described the embodiments in accordance with the present invention, it should be clear to those skilled in the art that further embodiments may be made without departing from the scope of the present invention.

What is claimed is:

1. A calibration mechanism for an optical module of a sheet-fed scanner which includes a casing, a fixed optical module in the casing, the calibration mechanism installed in the casing, the calibration mechanism comprising:
   a calibration strip; and
   a driving unit for driving the calibration strip to move over the optical module so as to provide the optical module to scan and to calibrate, including a roller and a flexible strip which has a first end fixed to the roller and a second end located remote to the first end and movable with respect to the roller, the calibration strip located on the second end;
   wherein, when the roller rotates, the roller enables the second end of the flexible strip to recede from or advance towards the roller, such that the calibration strip moves relatively to the optical module.

2. The mechanism as claimed in claim 1, wherein the driving unit further includes a shaft, wherein the roller is mounted on the shaft.

3. The mechanism as claimed in claim 2, wherein the roller on the shaft has a slit for the first end of the flexible strip to be inserted.

4. The mechanism as claimed in claim 2, wherein the flexible strip and the calibration strip are made into a one-piece member.

5. The mechanism as claimed in claim 1, wherein a transparent cap is mounted on the calibration strip.

6. The mechanism as claimed in claim 5, wherein the transparent cap is made of glass.

* * * * *